US012592536B2

(12) United States Patent
Zhang et al.

(10) Patent No.: US 12,592,536 B2
(45) Date of Patent: Mar. 31, 2026

(54) METHOD AND APPARATUS FOR CONTROLLING OPTICAL FIBER AMPLIFIER, SYSTEM, TRANSMISSION NODE AND STORAGE MEDIUM

(71) Applicant: Hangzhou AliCloud Feitian information Technology Co., Ltd., Hangzhou (CN)

(72) Inventors: Huan Zhang, Hangzhou (CN); Liang Dou, Beijing (CN); Sai Chen, Hangzhou (CN); Chongjin Xie, Morganville, NJ (US); Xingbin Li, Hangzhou (CN)

(73) Assignee: HANGZHOU ALICLOUD FEITIAN INFORMATION TECHNOLOGY CO., LTD., Hangzhou (CN)

( * ) Notice: Subject to any disclaimer, the term of this patent is extended or adjusted under 35 U.S.C. 154(b) by 268 days.

(21) Appl. No.: 18/681,465

(22) PCT Filed: Jul. 29, 2022

(86) PCT No.: PCT/CN2022/109238
§ 371 (c)(1),
(2) Date: Feb. 5, 2024

(87) PCT Pub. No.: WO2023/011374
PCT Pub. Date: Feb. 9, 2023

(65) Prior Publication Data
US 2024/0339800 A1 Oct. 10, 2024

(30) Foreign Application Priority Data
Aug. 6, 2021 (CN) .......................... 202110899560.5

(51) Int. Cl.
H04J 14/02 (2006.01)
H01S 3/10 (2006.01)
(Continued)

(52) U.S. Cl.
CPC ......... H01S 3/10015 (2013.01); H04B 10/25 (2013.01); H04J 14/02 (2013.01); *H01S 3/06754* (2013.01)

(58) Field of Classification Search
None
See application file for complete search history.

(56) References Cited

U.S. PATENT DOCUMENTS 8,483,560 B2 * 7/2013 Miyaji ................ H04J 14/0275
398/33
10,135,525 B2 * 11/2018 Huang ............... H04B 10/0791
(Continued)

FOREIGN PATENT DOCUMENTS

CN 1467945 A 1/2004
CN 1738220 A 2/2006
(Continued)

OTHER PUBLICATIONS

International Search Report dated Oct. 13, 2022 regarding International Application No. PCT/CN2022/109238.
(Continued)

*Primary Examiner* — Jai M Lee

(57) ABSTRACT

A method and an apparatus for controlling an optical fiber amplifier, a system, a transmission node and a storage medium. WDM transmission systems are deployed between a first communication end and a second communication end. At least one target WDM transmission system includes a first transmission node and a second transmission node. The first transmission node receives a first control signal including an identifier of the second transmission node, and switches on a transmit-end optical fiber amplifier of the first transmission node if determining that the first control signal is a normal control signal and the second transmission node identifier matches a pre-stored first reference node identifier. The second transmission node receives a second control
(Continued)

Transmission node a1          Transmission node b1 signal including an identifier of the first transmission node, and performs a similar judgment to switch on a transmit-end optical fiber amplifier of the second transmission node.

19 Claims, 6 Drawing Sheets

(51) Int. Cl.
H04B 10/25        (2013.01)
*H01S 3/067*        (2006.01)

(56)                References Cited

U.S. PATENT DOCUMENTS

| | | | | |
|---|---|---|---|---|
| 10,560,212 | B2 * | 2/2020 | Al Sayeed | ............ H04J 14/021 |
| 2003/0223745 | A1 * | 12/2003 | Tomofuji | ............ H04J 14/0252 |
| | | | | 398/32 |
| 2009/0304381 | A1 * | 12/2009 | Muppidi | ............ H04J 14/0267 |
| | | | | 398/9 |

FOREIGN PATENT DOCUMENTS

| | | | |
|---|---|---|---|
| CN | 1859176 | A | 11/2006 |
| CN | 1874193 | A | 12/2006 |
| CN | 101272182 | A | 9/2008 |
| CN | 102386972 | A | 3/2012 |
| CN | 103248420 | A | 8/2013 |
| CN | 103684835 | A | 3/2014 |
| CN | 113346346 | A | 9/2021 |

OTHER PUBLICATIONS

First Office Action dated Sep. 10, 2021 regarding Chinese Application No. 202110899560.5.
Notification to Grant for Chinese Application No. 202110899560.5.

* cited by examiner

Transmission
node a1

Transmission
node b1

METHOD AND APPARATUS FOR CONTROLLING OPTICAL FIBER AMPLIFIER, SYSTEM, TRANSMISSION NODE AND STORAGE MEDIUM

CROSS-REFERENCE TO RELATED APPLICATIONS

This application is a National Stage of International Application No. PCT/CN2022/109238, filed on Jul. 29, 2022, which claims priority to Chinese patent application No. 202110899560.5, entitled "METHOD AND APPARATUS FOR CONTROLLING OPTICAL FIBER AMPLIFIER, SYSTEM, TRANSMISSION NODE AND STORAGE MEDIUM" and filed with the China National Intellectual Property Administration on Aug. 6, 2021. The disclosures of the aforementioned applications are hereby incorporated by reference in their entireties.

TECHNICAL FIELD

The present disclosure relates to the field of optical fiber communication technology and, in particular, to a method and an apparatus for controlling an optical fiber amplifier, a system, a transmission node and a storage medium.

BACKGROUND

With the development of cloud computing, the demand for interconnection bandwidth has increased rapidly. For the interconnection between communication entities such as digital centers (DC for short), generally one or more wavelength division multiplexing (WDM for short) transmission systems are utilized, to provide high-capacity interconnection. Currently, dense wavelength division multiplexing (DWDM for short) transmission systems are widely used.

In order to meet the needs of long-distance transmission, the WDM transmission system amplifies optical signals through optical fiber amplifiers, such as an erbium doped fiber amplifier (EDFA for short). When the system is in a full load state, the optical power of the optical fiber on a transmission line is usually high. When the optical fiber is interrupted, if the laser is directly radiated into the environment, it will cause casualties and safety problems. Therefore, when the optical fiber is interrupted, it is desirable that the WDM transmission system is capable of automatically triggering a shutdown of the optical fiber amplifier. Correspondingly, when the optical fiber is restored from interruption, the optical fiber amplifier can also be automatically switched on.

However, if the optical fibers connecting different communication entities are mistakenly connected together during manual repair of the interrupted optical fibers, the optical fiber amplifier will be switched on at this time, but due to the incorrect connection of the optical fibers, data transmission errors will occur, causing traffic black holes and data security issues.

SUMMARY

Embodiments of the present disclosure provide a method and an apparatus for controlling an optical fiber amplifier, a system, a transmission node and a storage medium, to achieve accurate switching control of optical fiber amplifiers in different WDM transmission systems.

In a first aspect, an embodiment of the present disclosure provides a method for controlling an optical fiber amplifier, which is applied to an optical fiber communication system. The optical fiber communication system includes a first communication end and a second communication end. A plurality of wavelength division multiplexing transmission systems are deployed between the first communication end and the second communication end and include at least one target wavelength division multiplexing transmission system. The target wavelength division multiplexing transmission system includes a first transmission node and a second transmission node. The method includes:

receiving, by the first transmission node, through an optical supervisory channel, a first control signal sent by the second transmission node, in response to a recovery of an interrupted optical fiber between the first transmission node and the second transmission node, where the first control signal includes an identifier of the second transmission node;

switching on, by the first transmission node, a transmit-end optical fiber amplifier of the first transmission node which has been switched off, if the first transmission node determines that the first control signal is a preset normal control signal and that the identifier of the second transmission node matches a pre-stored first reference node identifier;

sending, by the first transmission node, through the optical supervisory channel, a second control signal including an identifier of the first transmission node to the second transmission node, such that the second transmission node switches on a transmit-end optical fiber amplifier of the second transmission node which has been switched off, when determining that the second control signal is a preset normal control signal and that the identifier of the first transmission node matches a pre-stored second reference node identifier.

In a second aspect, an embodiment of the present disclosure provides an apparatus for controlling an optical fiber amplifier, which is applied to an optical fiber communication system. The optical fiber communication system includes a first communication end and a second communication end. A plurality of wavelength division multiplexing transmission systems are deployed between the first communication end and the second communication end and include at least one target wavelength division multiplexing transmission system. The target wavelength division multiplexing transmission system includes a first transmission node and a second transmission node. The apparatus is located at the first transmission node and includes:

a receiving module, configured to receive, through an optical supervisory channel, a first control signal sent by the second transmission node, in response to a recovery of an interrupted optical fiber between the first transmission node and the second transmission node, where the first control signal includes an identifier of the second transmission node;

a processing module, configured to switch on a transmit-end optical fiber amplifier of the first transmission node which has been switched off, if it is determined that the first control signal is a preset normal control signal and that the identifier of the second transmission node matches a pre-stored first reference node identifier;

a sending module, configured to send, through the optical supervisory channel, a second control signal including an identifier of the first transmission node to the second transmission node, such that the second transmission node switches on, when determining that the second control signal is a preset normal control signal and that the identifier of the first transmission node matches a pre-stored second reference node identifier, a transmit-end optical fiber amplifier of the second transmission node which has been switched off.

In a third aspect, an embodiment of the present disclosure provides a transmission node, including: a memory, a processor, and a communication interface; where an executable code is stored in the memory, and when the executable code is executed by the processor, the processor is caused to perform the method for controlling an optical fiber amplifier as described in the first aspect.

In a fourth aspect, an embodiment of the present disclosure provides a non-transitory machine-readable storage medium, where an executable code is stored on the non-transitory machine-readable storage medium, and when the executable code is executed by a processor, the processor is caused to perform at least the method for controlling an optical fiber amplifier as described in the first aspect.

In a fifth aspect, an embodiment of the present disclosure provides an optical fiber communication system, including:

a first communication end, a second communication end, and a plurality of wavelength division multiplexing transmission systems deployed between the first communication end and the second communication end; where the plurality of wavelength division multiplexing transmission systems include at least one target wavelength division multiplexing transmission system, and the target wavelength division multiplexing transmission system, as any of the plurality of wavelength division multiplexing transmission systems, includes a first transmission node and a second transmission node;

the first transmission node is configured to: receive, through an optical supervisory channel, a first control signal sent by the second transmission node, where the first control signal includes an identifier of the second transmission node; switch on a transmit-end optical fiber amplifier of the first transmission node which has been switched off, if it is determined that the first control signal is a preset normal control signal and that the identifier of the second transmission node matches a pre-stored first reference node identifier; send, through the optical supervisory channel, a second control signal including an identifier of the first transmission node to the second transmission node;

the second transmission node is configured to: send, through the optical supervisory channel, the first control signal to the first transmission node; and switch on a transmit-end optical fiber amplifier of the second transmission node which has been switched off, if it is determined that the second control signal is a preset normal control signal and that the identifier of the first transmission node matches a pre-stored second reference node identifier.

In a sixth aspect, an embodiment of the present disclosure provides an electronic device, including:

a processor; a memory for storing an instruction executable by the processor;

the processor is configured to perform the method for controlling an optical fiber amplifier as described in the first aspect.

In a seventh aspect, an embodiment of the present disclosure provides a computer program product, where when an instruction in the computer program product is executed by a processor of an electronic device, the electronic device is enabled to perform the method for controlling an optical fiber amplifier as described in the first aspect.

The solutions provided by the embodiments of the present disclosure are applied to the following optical fiber communication system: the optical fiber communication system includes a first communication end and a second communication end, between which a plurality of wavelength division multiplexing transmission systems are deployed. In an implementation, the plurality of wavelength division multiplexing transmission systems share one optical cable, that is, each wavelength division multiplexing transmission system uses at least one pair of optical fibers in the optical cable, and the optical fiber pairs used by different wavelength division multiplexing transmission systems are different. One (called a target wavelength division multiplexing transmission system) of the plurality of wavelength division multiplexing transmission systems is taken as an example. The target wavelength division multiplexing transmission system includes a first transmission node and a second transmission node. When an optical fiber between the first transmission node and the second transmission node used by the target wavelength division multiplexing transmission system is interrupted, a transmit-end optical fiber amplifier of the first transmission node and a transmit-end optical fiber amplifier of the second transmission node will be controlled to be switched off. If the interrupted optical fiber between the first transmission node and the second transmission node is recovered, first the first transmission node can receive, through an optical supervisory channel, a first control signal sent by the second transmission node, where the first control signal includes an identifier of the second transmission node. Then, if the first transmission node determines that the first control signal is a preset normal control signal and that the identifier of the second transmission node matches a pre-stored first reference node identifier, the first transmission node switches on the transmit-end optical fiber amplifier of the first transmission node which has been switched off. Then, the first transmission node sends a second control signal to the second transmission node through the optical supervisory channel. The second control signal includes an identifier of the first transmission node, such that the second transmission node switches on, when determining that the second control signal is a preset normal control signal and that the identifier of the first transmission node matches a pre-stored second reference node identifier, the transmit-end optical fiber amplifier of the second transmission node which has been switched off.

It can be seen that in the embodiments of the present disclosure, after the interrupted optical fiber is recovered, the first transmission node and the second transmission node respectively check the first control signal and the second control signal, i.e., determine whether the node identifier carried in the respective control signal sent by the other party corresponds to the opposite end that is supposed to be in place. After determining that the communication entities that connected by the interrupted optical fiber are correct, the optical fiber amplifier is switched on to resume data transmission of the target wavelength division multiplexing transmission system. Through this solution, accurate switching control of optical fiber amplifiers in different WDM transmission systems is achieved, ensuring data security.

BRIEF DESCRIPTION OF DRAWINGS

In order to more clearly illustrate the technical solutions of embodiments of the present disclosure, a brief introduction will be made below to the drawings required for the description of the embodiments. Obviously, the drawings in the following description are some embodiments of the present disclosure. For those of ordinary skill in the art, other drawings can also be obtained based on these drawings without making creative efforts.

DESCRIPTION OF EMBODIMENTS

In order to make the purpose, technical solutions and advantages of embodiments of the present disclosure more clear, the technical solutions of the embodiments of the present disclosure will be clearly and comprehensively described below in conjunction with the drawings of the embodiments of the present disclosure. Obviously, the described embodiments are some embodiments of the present disclosure, but not all embodiments. All other embodiments obtained by those of ordinary skill in the art based on the embodiments in the present disclosure without making creative efforts fall within the protection scope of the present disclosure.

In addition, the sequence of steps in the following method embodiments is only an example and is not strictly limited.

Data centers are taken as an example. When the interconnection bandwidth between data centers exceeds the carrying capacity of one WDM transmission system (i.e., one WDM plane), a plurality of WDM transmission systems can be built to bear the bandwidth demand. In an implementation scenario, the plurality of WDM transmission systems may share one optical cable, and this optical cable includes optical fibers used by each of the plurality of WDM transmission systems. To facilitate understanding, an optical fiber communication system including a plurality of WDM transmission systems provided by an embodiment of the present disclosure is illustrated with reference to FIG. 1. Of course, it should be noted that even if the plurality of WDM transmission systems do not share one optical cable, they are still suitable for the solutions provided by embodiments of the present disclosure.

Figure 1:
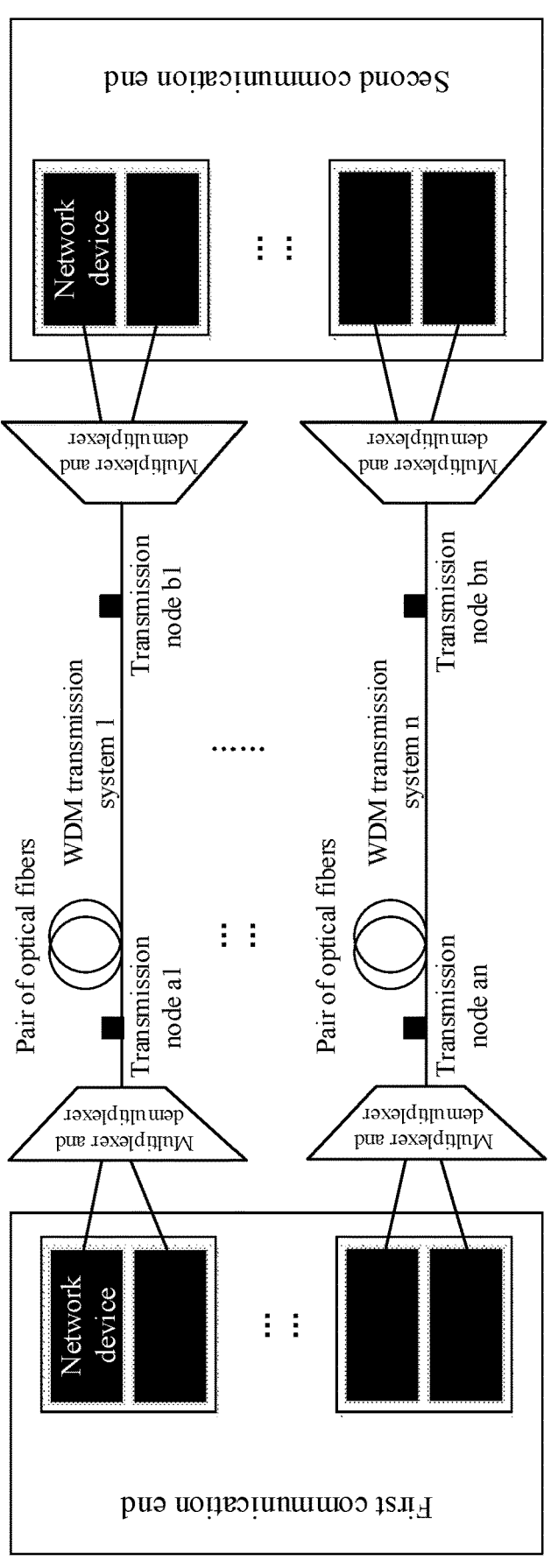
FIG. 1 is a schematic diagram of an optical fiber communication system provided by an embodiment of the present disclosure.

As shown in FIG. 1, the optical fiber communication system includes: a first communication end, a second communication end, and a plurality of WDM transmission systems deployed between the first communication end and the second communication end. In an implementation, the plurality of WDM transmission systems share one optical cable.

As shown in FIG. 1, the plurality of WDM transmission systems deployed between the first communication end and the second communication end are in a parallel relationship, that is, the plurality of WDM transmission systems are deployed in parallel (or in concurrency) between the first communication end and the second communication end.

Specifically, as shown in FIG. 1, it is assumed that the first communication end and the second communication end are data centers respectively (not limited to this). The first communication end includes a plurality of network devices. Similarly, the second communication end also includes a plurality of network devices. In practical applications, the network devices included in the first communication end and the second communication end can be grouped, and a group includes one or more network devices. A WDM transmission system is built between a group of network devices having communication interaction demands in the first communication end and the second communication end. In this way, as shown in FIG. 1, n WDM transmission systems can be formed, with n being greater than or equal to 1.

In addition, as shown in FIG. 1, it is assumed that a WDM transmission system will use a pair of optical fibers for data transmission, corresponding to two directions (i.e., receiving and transmitting) respectively. In this way, n WDM transmission systems will use 2n optical fibers, that is, n pairs of optical fibers. In an implementation, these n pairs of optical fibers are wrapped in a same optical cable, such that the plurality of WDM transmission systems share one optical cable.

As shown in FIG. 1, each WDM transmission system may include a pair of multiplexers and demultiplexers and at least a pair of transmission nodes. For example, a WDM transmission system 1 includes a transmission node a1 and a transmission node b1, and a WDM transmission system n includes a transmission node an and a transmission node bn.

The multiplexer and demultiplexer are used to combine optical signals of different wavelengths emitted by a plurality of network devices connected thereto, and to separate optical signals of different wavelengths from the combined optical signal. Where the transmission node is equivalent to a relay point in a transmission link, and can realize optical signal amplification, monitoring, transceiving and other functions.

In practical applications, according to a communication distance between the first communication end and the second communication end, one or more pairs of transmission nodes can be appropriately deployed between the first communication end and the second communication end. Since the signal processing processes between every two adjacent transmission nodes are similar, for convenience of description, embodiments of the present disclosure only illustrate a situation in which a WDM transmission system includes a pair of transmission nodes.

It is understandable that, in fact, the WDM transmission system also includes many other component units, for which reference can be made to the prior art and details will not be described herein.

The internal composition of the transmission nodes will be illustrated below as an example with reference to FIG. 2, and specifically illustrated with reference to the transmission node a1 and the transmission node b1 illustrated in FIG. 1.

Figure 2:
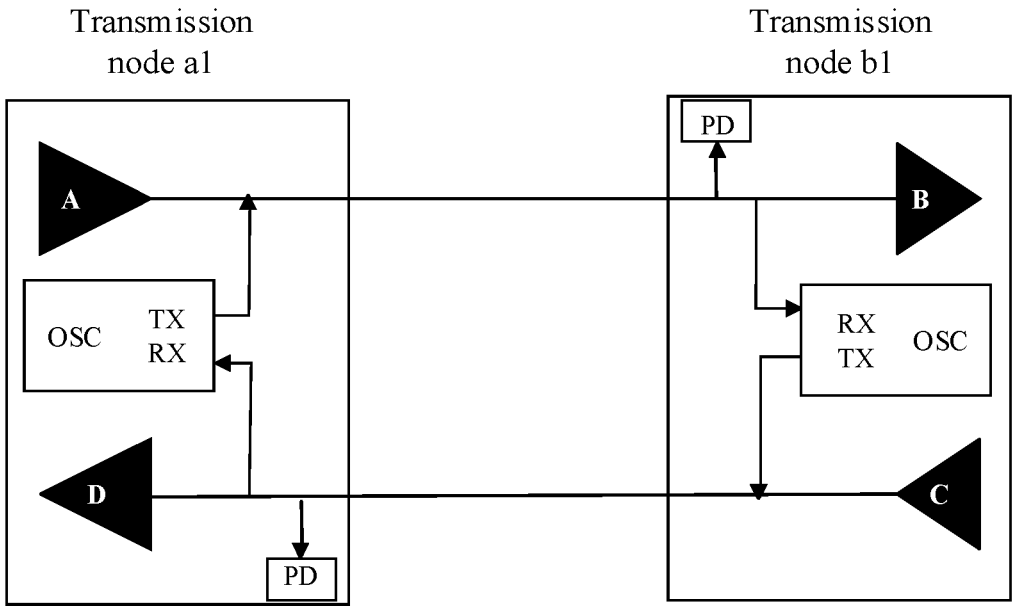
FIG. 2 is a schematic diagram of a group of transmission nodes in a WDM transmission system provided by an embodiment of the present disclosure.

As shown in FIG. 2, a pair of optical fibers are connected between the transmission node a1 and the transmission node b1. The transmission node a1 includes a transmit-end optical fiber amplifier A, a receive-end optical fiber amplifier D, and a photo detector (PD for short) connected to an input end of the receive-end optical fiber amplifier D. In practical applications, a signal transmitted between the transmission node a1 and the transmission node b1 includes not only an optical signal of a data plane, but also an optical signal of a control plane. A wavelength of the optical signal of the control plane is different from that of the optical signal of the data plane. The optical signal of the control plane is specifically transmitted through an optical supervisory channel (OSC for short). Therefore, the transmission node a1 also includes a transceiver corresponding to the optical supervisory channel; represented by a rectangular box with the word OSC in the drawings, where TX and RX represent a sending interface and a receiving interface respectively. The PD is used to detect the optical signal of the data surface which is referred to as the optical data signal hereinafter; and the optical signal of the control surface is referred to as the control signal.

The internal composition of the transmission node a1 is introduced above, and the transmission node b1 is of similar composition. The transmission node b1 includes a transmit-end optical fiber amplifier C, a receive-end optical fiber amplifier B, a PD connected to an input end of the receive-end optical fiber amplifier B, and a transceiver corresponding to the optical supervisory channel.

The transmit-end optical fiber amplifier A and the transmit-end optical fiber amplifier C in the transmission node a1 and the transmission node b1 are used to amplify a power of an optical data signal, such that the optical data signal can be transmitted over a long distance in the WDM transmission system. The receive-end optical fiber amplifier D and the receive-end optical fiber amplifier B in the transmission node a1 and the transmission node b1 are used to compensate for a loss of the optical data signal caused during transmission in the optical fiber link. A type of an optical fiber amplifier includes but is not limited to EDFA.

In practical applications, when the plurality of WDM transmission systems are deployed between the first communication end and the second communication end and share one optical cable, if this optical cable is interrupted, then resulting optical fiber interruption can also occur to all or part of the plurality of WDM transmission systems. Or, when the plurality of WDM transmission systems are carried by more than one optical cable, interruption of some optical cables may also cause optical fiber interruption occurred to all or part of the plurality of WDM transmission systems. When an optical fiber interruption occurs in a WDM transmission system, the transmit-end optical fiber amplifier of the transmission node in the WDM transmission system is automatically switched off. The automatic switching-off process is described in detail below. Afterwards, maintenance personnel repairs the interrupted optical fiber. During the repair process, there may be such a problem: optical fibers of different WDM transmission systems are cross-connected due to human negligence. At this time, since the interrupted optical fiber has been repaired, a process of automatically switching on the optical fiber amplifier which has been switched off may be triggered. However, an objective result is that human error in connecting a wrong optical fiber leads to cross-connection of different WDM transmission systems and data transmission based on WDM transmission systems with incorrect connections leads to traffic black holes and data security issues. Simply speaking, the traffic black hole is that data that is supposed to be sent from x to y is continuously sent to z in error due to x being connected to z, in which x, y, and z refer to the communication entities connected by the optical fiber, such as a network device group illustrated in FIG. 1.

Figure 3:
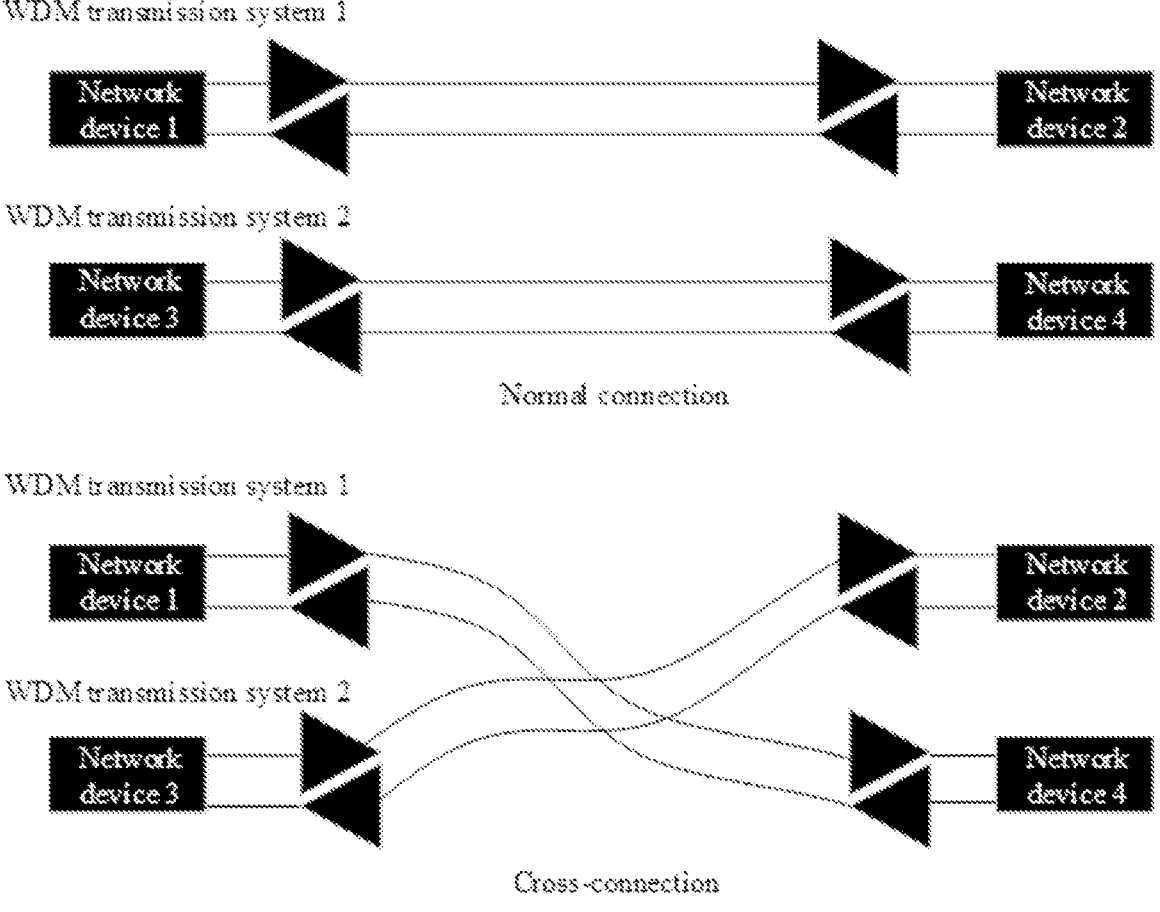
FIG. 3 is a schematic structural diagram of normal connection and cross-connection of two WDM planes provided by an embodiment of the present disclosure.

To facilitate understanding, a description is provided as an example with reference to FIG. 3. In FIG. 3, it is assumed that there are two WDM transmission systems sharing one optical cable. The two WDM transmission systems are the WDM transmission system 1 connecting a network device 1 and a network device 2, and the WDM transmission system 2 connecting a network device 3 and a network device 4. When the interrupted optical cables are repaired, it is assumed that as shown in the drawing, the maintenance personnel mistakenly connected the optical fiber in which the optical fiber that is supposed to connect the network device 1 and the network device 2 is connected to the network device 1 and the network device 4, and the optical fiber that is supposed to connect the network device 3 and the network device 4 is connected to the network device 2 and the network device 3, that is, the WDM transmission system 1 and the WDM transmission system 2 are cross-connected. It can be seen that if the optical fiber amplifier of each transmission node in the two WDM transmission systems is switched on based on this optical fiber repair result, then the data sent by the network device 1 will be incorrectly sent to the network device 4, and the same applies to the network device 2 and the network device 3.

Figure 4:
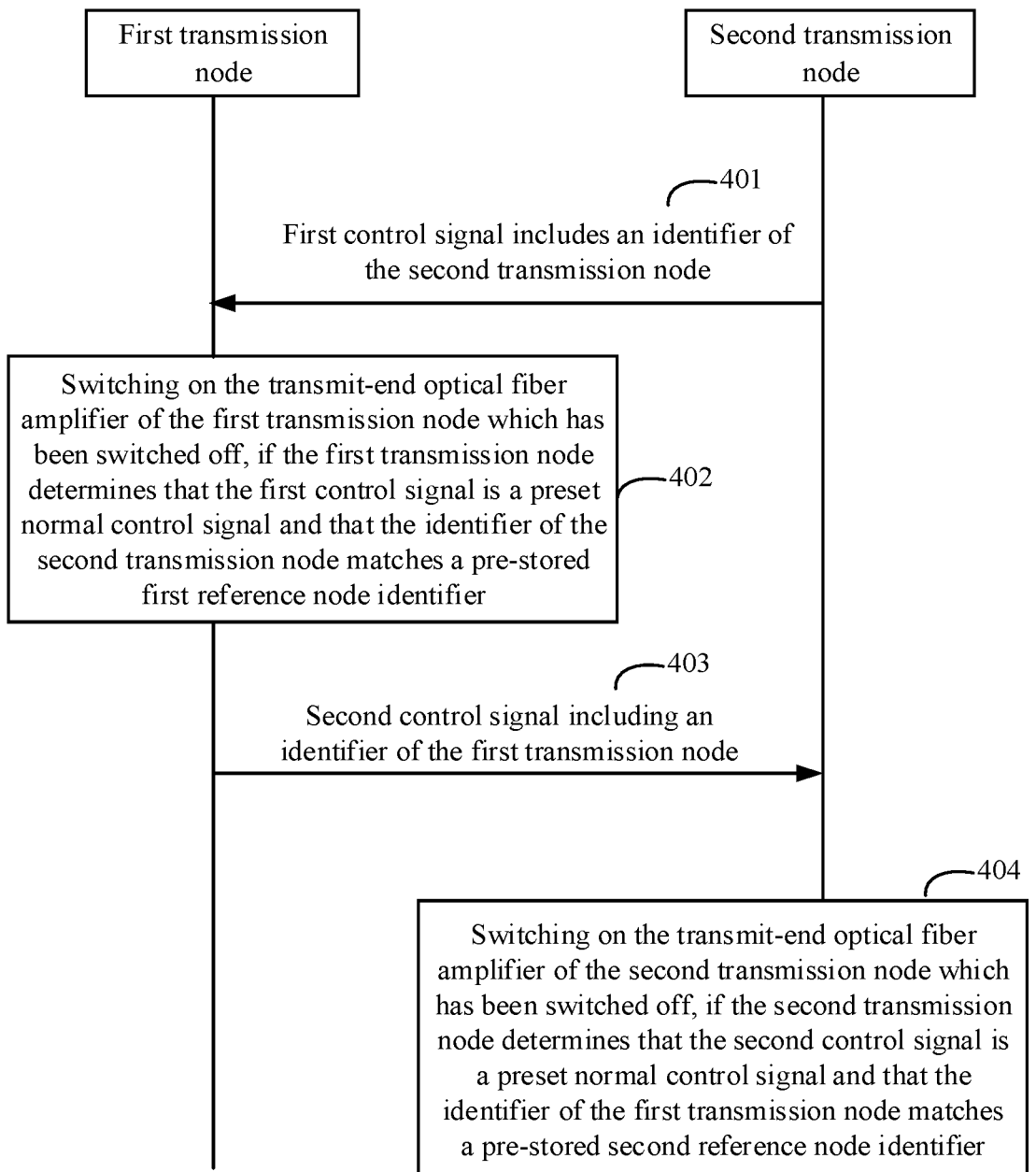
FIG. 4 is an interactive flow chart of a method for controlling an optical fiber amplifier provided by an embodiment of the present disclosure.

Therefore, in the above situation, it is necessary to automatically and accurately switch on the optical fiber amplifier after the interrupted optical fiber is repaired. Any one of the plurality of WDM transmission systems sharing one optical cable is taken as an example. It is assumed that the WDM transmission system includes a first transmission node and a second transmission node. In order to realize this function, in response to the recovery of the interrupted optical fiber between the first transmission node and the second transmission node, the first transmission node and the second transmission node need to perform steps in an embodiment shown in FIG. 4 respectively:

401, sending, by the second transmission node, through the optical supervisory channel, a first control signal to the first transmission node, where the first control signal includes an identifier of the second transmission node;

402, switching on, by the first transmission node, the transmit-end optical fiber amplifier of the first transmission node which has been switched off, if the first transmission node determines that the first control signal is a preset normal control signal and that the identifier of the second transmission node matches a pre-stored first reference node identifier;

403, sending, by the first transmission node, through the optical supervisory channel, a second control signal including an identifier of the first transmission node to the second transmission node;

404, switching on, by the second transmission node, the transmit-end optical fiber amplifier of the second transmission node which has been switched off, if the second transmission node determines that the second control signal is a preset normal control signal and that the identifier of the first transmission node matches a pre-stored second reference node identifier.

Figure 5:
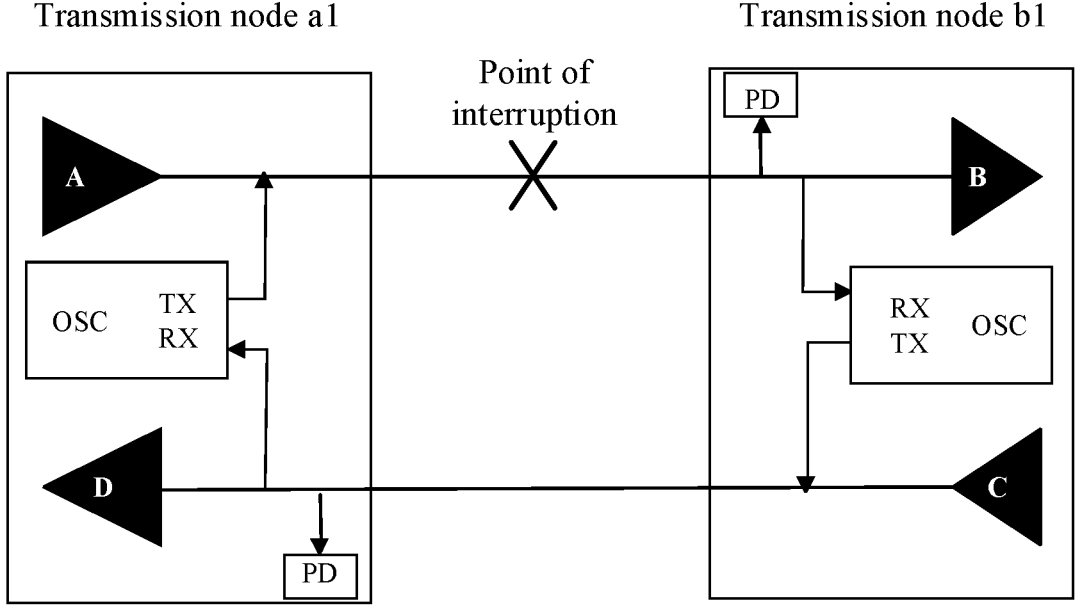
FIG. 5 is a schematic diagram of a situation of an optical fiber interruption provided by an embodiment of the present disclosure.

To facilitate understanding, the execution process of the above embodiment is described as an example with reference to the situation shown in FIG. 5. In FIG. 5, it is assumed that the above first transmission node is the transmission node b1, the above second transmission node is the transmission node a1, and the above optical supervisory channel is represented as the OSC channel in the following.

In an embodiment of the present disclosure, the transmission node a1 and the transmission node b1 connected to a same optical fiber have pre-stored each other's node identifier, that is, the transmission node a1 pre-stores the node identifier of the transmission node b1 (i.e., the second reference node identifier described above), and the transmission node b1 pre-stores the node identifier of the transmission node a1 (i.e., the first reference node identifier described above). The reference node identifier can be manually configured to the corresponding transmission node after the WDM transmission system is built, or can be mutually informed by adjacent transmission nodes connected to the same optical fiber through preset configuration information.

As shown in FIG. 5, it is assumed that an optical fiber shown between the transmission node a1 and the transmission node b1 is interrupted. After the optical fiber is repaired, the transmission node a1 sends the first control signal to the transmission node b1 through the OSC channel, where the first control signal includes the identifier of the transmission node a1, indicating that the first control signal is sent by the transmission node a1. After the transmission node b1 receives the first control signal, if it is determined that the first control signal is a preset normal control signal and the identifier of the transmission node a1 matches the pre-stored first reference node identifier, it means that the transmission node a1 is indeed the opposite end node that is supposed to be connected through this optical fiber, and the transmission node b1 then switches on the transmit-end optical fiber amplifier C which has been switched off.

As mentioned above, for the transmission node b1, the first reference node identifier stored therein is the identifier of the transmission node a1. After parsing the identifier of the transmission node a1 included in the first control signal, the transmission node b1 determines whether the identifier of the transmission node a1 matches the first reference node identifier.

For the judgment of whether the first control signal is a preset normal control signal, in practical applications, when the optical fiber connection is normal, according to the provisions of the corresponding communication protocol, which kind of control signal should be transmitted between the transmission nodes is specified for different timing. Therefore, if the first control signal received by the transmission node b1 is a certain preset control signal under normal optical fiber connection, it is determined that the first control signal is a normal control signal. Or, to put it another way, the normal control signal can also be understood as a control signal that does not include a pre-set error indicator. Therefore, if the transmission node b1 determines that the first control signal does not carry the pre-set error indicator, it is determined that the first control signal is a preset normal control signal.

At this point, the transmit-end optical fiber amplifier C of the transmission node b1 that was previously switched off due to optical fiber interruption is switched on.

Similarly, the transmit-end optical fiber amplifier A of the transmission node a1 that was previously switched off due to optical fiber interruption can also be switched on. Specifically, the transmission node b1 sends the second control signal to the transmission node a1 through the OSC channel. The second control signal includes the identifier of the transmission node b1, such that the transmission node a1 switches on, when determining that the second control signal is a preset normal control signal and that the identifier of the first transmission node b1 matches the pre-stored second reference node identifier, the transmit-end optical fiber amplifier A of the second transmission node a1 which has been switched off.

In the above solution, for the plurality of WDM transmission systems sharing one optical cable after the interrupted optical fiber is repaired, by carrying the node identifier in the above control signal, the two transmission nodes connected by an optical fiber can be enabled to automatically determine whether the optical fiber connection is correct, and the corresponding optical fiber amplifier is switched on only when the connection is correct. If the connection is incorrect, the corresponding optical fiber amplifier will not be activated, thus avoiding data transmission security issues caused by incorrect optical fiber connection.

The above describes the process of switching on the optical fiber amplifier after the interrupted optical fiber is repaired. The following describes the process of automatically switching off the optical fiber amplifier after the optical fiber is interrupted. Still, the first transmission node and the second transmission node are taken as an example for illustration.

In response to the interruption of the optical fiber between the first transmission node and the second transmission node, if the first transmission node does not receive, through the OSC channel, the preset normal control signal sent by the second transmission node, nor detect an optical data signal sent by the second transmission node, the first transmission node then switches off the transmit-end optical fiber amplifier of the first transmission node. The first transmission node sends a third control signal including a preset error indicator to the second transmission node through the OSC channel, such that the second transmission node switches off the transmit-end optical fiber amplifier of the second transmission node according to the error indicator.

The optical fiber interruption situation illustrated in FIG. 5 is still used as an example for illustration. After an optical fiber between the transmission node a1 and the transmission node b1 is interrupted, the normal control signal originally (when the optical fiber is not interrupted) sent by the transmission node a1 to the transmission node b1 through the OSC channel cannot be sent normally, and the transmission node b1 thus cannot be able to receive the normal control signal through the OSC channel. At this time, the transmission node b1 may detect an abnormal control signal such as a loss of signal (LOS for short), a loss of frame (LOF for short), a loss of lock (LOL for short), etc. through the OSC channel. In addition to the control signal, if the transmission node b1 does not either detect the optical data signal sent by the transmission node a1, then the transmission node b1 determines that an optical fiber interruption has occurred and switches off the transmit-end optical fiber amplifier C.

After that, the transmission node b1 sends the third control signal to the transmission node a1 through the OSC channel. The third control signal includes the preset error indicator. The error indicator includes but is not limited to a remote defect indicator (RDI for short). After receiving the third control signal and parsing the RDI from it, the transmission node a1 learns that the optical fiber interruption has occurred and switches off the transmit-end optical fiber amplifier A.

Apparatuses for controlling an optical fiber amplifier of one or more embodiments of the present disclosure will be described in detail below. Those skilled in the art can understand that these apparatuses can be constructed using commercially available hardware components and configured through the steps taught in this solution.

Figure 6:
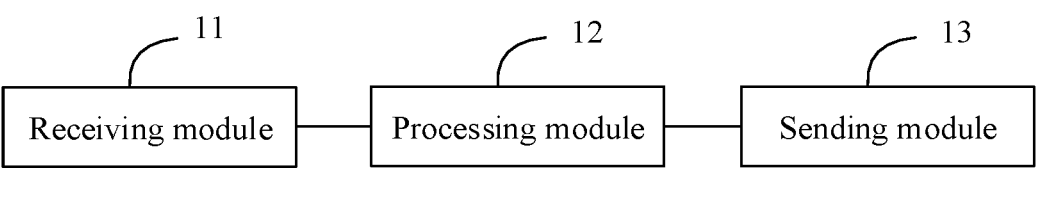
FIG. 6 is a schematic structural diagram of an apparatus for controlling an optical fiber amplifier provided by an embodiment of the present disclosure.

FIG. 6 is a schematic structural diagram of an apparatus for controlling an optical fiber amplifier provided by an embodiment of the present disclosure. The apparatus is located at the first transmission node and is applied to an optical fiber communication system. The optical fiber communication system includes a first communication end and a second communication end. A plurality of wavelength division multiplexing transmission systems are deployed between the first communication end and the second communication end and include at least one target wavelength division multiplexing transmission system. The target wavelength division multiplexing transmission system includes a first transmission node and a second transmission node. As shown in FIG. 6, the apparatus includes: a receiving module 11, a processing module 12, and a sending module 13.

The receiving module 11 is configured to receive, through an optical supervisory channel, a first control signal sent by the second transmission node, in response to a recovery of an interrupted optical fiber between the first transmission node and the second transmission node, where the first control signal includes an identifier of the second transmission node.

The processing module 12 is configured to switch on a transmit-end optical fiber amplifier of the first transmission node which has been switched off, if determining that the first control signal is a preset normal control signal and that the identifier of the second transmission node matches a pre-stored first reference node identifier.

The sending module 13 is configured to send, through the optical supervisory channel, a second control signal including an identifier of the first transmission node to the second transmission node, such that the second transmission node switches on, when determining that the second control signal is a preset normal control signal and that the identifier of the first transmission node matches a pre-stored second reference node identifier, a transmit-end optical fiber amplifier of the second transmission node which has been switched off.

In an implementation, the processing module 12 is further configured to: determine that the first control signal is the preset normal control signal if it is determined that the first control signal does not carry a preset error indicator.

In an implementation, the processing module 12 is further configured to: switch off the transmit-end optical fiber amplifier of the first transmission node, in response to an interruption of the optical fiber between the first transmission node and the second transmission node and if none of the preset normal control signal sent by the second transmission node is received through the optical supervisory channel and none of an optical data signal sent by the second transmission node is detected. At this time, the sending module 13 is further configured to: send a third control signal to the second transmission node through the optical supervisory channel, where the third control signal includes a preset error indicator, such that the second transmission node switches off the transmit-end optical fiber amplifier of the second transmission node according to the error indicator.

The apparatus shown in FIG. 6 can perform the steps performed by the first transmission node in the previous embodiments. For detailed execution processes and technical effects, please refer to the description in the previous embodiments and description will not be repeated here.

Figure 7:
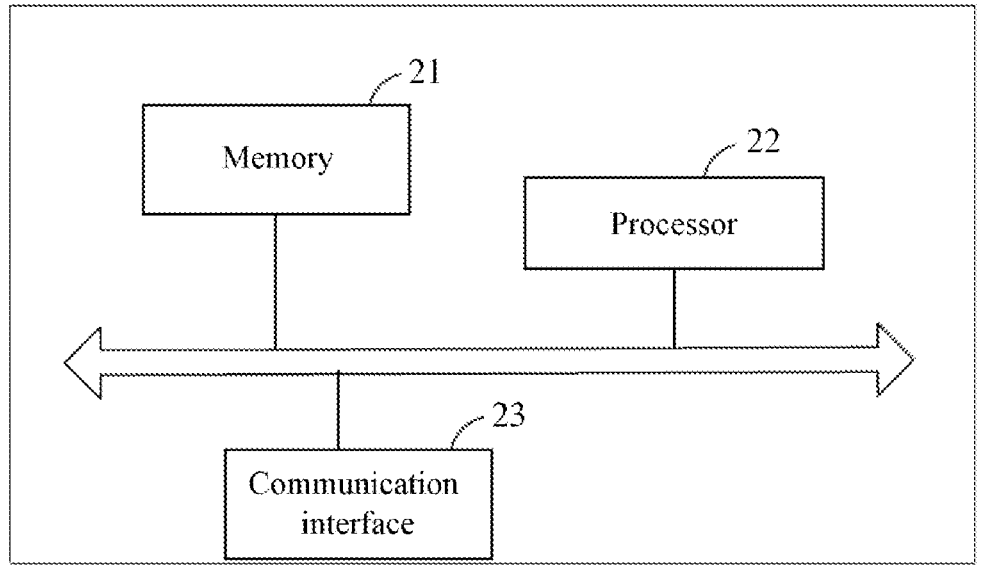
FIG. 7 is a schematic structural diagram of a transmission node provided by an embodiment of the present disclosure.

FIG. 7 is a schematic structural diagram of a transmission node provided by an embodiment of the present disclosure. The transmission node includes: a memory 21, a processor 22, and a communication interface 23, where the memory 21 stores an executable code. When the executable code is executed by the processor 22, the processor 22 is caused to perform the method for controlling an optical fiber amplifier as described in the previous embodiments.

In addition, an embodiment of the present disclosure provides a non-transitory machine-readable storage medium on which an executable code is stored, and when the executable code is executed by a processor of a transmission node, the processor is caused to perform at least the method for controlling an optical fiber amplifier provided in the previous embodiments.

In addition, an embodiment of the present disclosure provides an electronic device, which includes:

a processor; a memory for storing an instruction executable by the processor; and the processor is configured to execute the method for controlling an optical fiber amplifier provided in the previous embodiments.

In addition, an embodiment of the present disclosure provides a computer program product. When an instruction in the computer program product is executed by a processor of an electronic device, the electronic device is enabled to perform the method for controlling an optical fiber amplifier provided in the previous embodiments.

The apparatus embodiments described above are merely as examples, in which the units described as separate components may or may not be physically separated. Some or all of the modules can be selected according to actual needs to achieve the purpose of the solution of the embodiment. Those of ordinary skill in the art can understand and implement the solution of the embodiment without making creative efforts.

From the above description of the embodiments, those skilled in the art can clearly understand that each embodiment can be implemented by adding the necessary general hardware platform, or of course, can also be implemented by combining hardware and software. Based on this understanding, the above technical solutions essentially or the part contributing to the prior art thereof can be embodied in a form of a computer product, and the present disclosure can be implemented in a form of the computer program product implemented on one or more computer-available storage media (including but not limited to disk storage, CD-ROM, optical storage, etc.) including computer-available program codes.

Finally, it should be noted that the above embodiments are only used to illustrate the technical solutions of the present disclosure, but not to limit it; although the present disclosure has been described in detail with reference to the foregoing embodiments, those of ordinary skill in the art should understand that modifications may still be made to the technical solutions described in the foregoing embodiments, or equivalent substitutions may still be made to some of the technical features; however, these modifications or substitutions do not cause the essence of the corresponding technical solutions to deviate from the spirit and scope of the technical solutions of the embodiments of the present disclosure.

The invention claimed is:

1. A method for controlling an optical fiber amplifier, applied to an optical fiber communication system, wherein the optical fiber communication system comprises a first communication end and a second communication end, a plurality of wavelength division multiplexing transmission systems are deployed between the first communication end and the second communication end and comprise at least one target wavelength division multiplexing transmission system; the target wavelength division multiplexing transmission system comprises a first transmission node and a second transmission node;

the method comprises:

receiving, by the first transmission node, through an optical supervisory channel, a first control signal sent by the second transmission node, in response to a recovery of an interrupted optical fiber between the first transmission node and the second transmission node, wherein the first control signal comprises an identifier of the second transmission node;

switching on, by the first transmission node, a transmit-end optical fiber amplifier of the first transmission node which has been switched off, based on that the first transmission node determines that the first control signal is a preset normal control signal and that the identifier of the second transmission node matches a pre-stored first reference node identifier;

sending, by the first transmission node, through the optical supervisory channel, a second control signal comprising an identifier of the first transmission node to the second transmission node, such that the second transmission node switches on a transmit-end optical fiber amplifier of the second transmission node which has been switched off, when determining that the second control signal is a preset normal control signal and that the identifier of the first transmission node matches a pre-stored second reference node identifier.

2. The method according to claim 1, wherein the first transmission node determining that the first control signal is the preset normal control signal comprises:

determining, by the first transmission node, that the first control signal is the preset normal control signal based on that the first transmission node determines that the first control signal does not carry a preset error indicator.

3. The method according to claim 1, further comprising:

switching off, by the first transmission node, the transmit-end optical fiber amplifier of the first transmission node, in response to an interruption of the optical fiber between the first transmission node and the second transmission node and based on that the first transmission node does not receive, through the optical supervisory channel, the preset normal control signal sent by the second transmission node nor detect an optical data signal sent by the second transmission node.

4. The method according to claim 3, further comprising:

sending, by the first transmission node, through the optical supervisory channel, a third control signal comprising a preset error indicator to the second transmission node, such that the second transmission node switches off the transmit-end optical fiber amplifier of the second transmission node according to the error indicator.

5. A non-transitory machine-readable storage medium, wherein an executable code is stored on the non-transitory machine-readable storage medium, and when the executable code is executed by a processor, the processor is caused to perform the method for controlling an optical fiber amplifier according to claim 1.

6. The method according to claim 1, wherein the plurality of wavelength division multiplexing transmission systems are deployed in parallel between the first communication end and the second communication end.

7. The method according to claim 1, wherein the plurality of wavelength division multiplexing transmission systems share one optical cable.

8. An apparatus for controlling an optical fiber amplifier, applied to an optical fiber communication system, wherein the optical fiber communication system comprises a first communication end and a second communication end, a plurality of wavelength division multiplexing transmission systems are deployed between the first communication end and the second communication end and comprise at least one target wavelength division multiplexing transmission system; the target wavelength division multiplexing transmission system comprises a first transmission node and a second transmission node; the apparatus is located at the first transmission node and comprises:

a processor;

a memory for storing an instruction executable by the processor;

wherein the instruction, when executed by the processor, causes the processor to:

receive, through an optical supervisory channel, a first control signal sent by the second transmission node, in response to a recovery of an interrupted optical fiber between the first transmission node and the second transmission node, wherein the first control signal comprises an identifier of the second transmission node;

switch on a transmit-end optical fiber amplifier of the first transmission node which has been switched off, based on if determining that the first control signal is a preset normal control signal and that the identifier of the second transmission node matches a pre-stored first reference node identifier;

send, through the optical supervisory channel, a second control signal comprising an identifier of the first transmission node to the second transmission node, such that the second transmission node switches on, when determining that the second control signal is a preset normal control signal and that the identifier of the first transmission node matches a pre-stored second reference node identifier, a transmit-end optical fiber amplifier of the second transmission node which has been switched off.

9. The apparatus according to claim 8, wherein the processor is further caused to:

determine that the first control signal is the preset normal control signal based on that the first transmission node determines that the first control signal does not carry a preset error indicator.

10. The apparatus according to claim 8, wherein the processor is further caused to:

switch off the transmit-end optical fiber amplifier of the first transmission node, in response to an interruption of the optical fiber between the first transmission node and the second transmission node and based on that the first transmission node does not receive, through the optical supervisory channel, the preset normal control signal sent by the second transmission node nor detect an optical data signal sent by the second transmission node.

11. The apparatus according to claim 10, wherein the processor is further caused to:

send, through the optical supervisory channel, a third control signal comprising a preset error indicator to the second transmission node, such that the second transmission node switches off the transmit-end optical fiber amplifier of the second transmission node according to the error indicator.

12. The apparatus according to claim 8, wherein the plurality of wavelength division multiplexing transmission systems are deployed in parallel between the first communication end and the second communication end.

13. The apparatus according to claim 8, wherein the plurality of wavelength division multiplexing transmission systems share one optical cable.

14. An optical fiber communication system, comprising:

a first communication end, a second communication end, and a plurality of wavelength division multiplexing transmission systems deployed between the first communication end and the second communication end; wherein the plurality of wavelength division multiplexing transmission systems comprise at least one target wavelength division multiplexing transmission system, and the target wavelength division multiplexing transmission system, as any of the plurality of wavelength division multiplexing transmission systems, comprises a first transmission node and a second transmission node;

the first transmission node is configured to: receive, through an optical supervisory channel, a first control signal sent by the second transmission node, wherein the first control signal comprises an identifier of the second transmission node; switch on a transmit-end optical fiber amplifier of the first transmission node which has been switched off, based on determining that the first control signal is a preset normal control signal and that the identifier of the second transmission node matches a pre-stored first reference node identifier; send, through the optical supervisory channel, a second control signal comprising an identifier of the first transmission node to the second transmission node;

the second transmission node is configured to: send, through the optical supervisory channel, the first control signal to the first transmission node; and switch on a transmit-end optical fiber amplifier of the second transmission node which has been switched off, based on if determining that the second control signal is a preset normal control signal and that the identifier of the first transmission node matches a pre-stored second reference node identifier.

15. The system according to claim 14, wherein the first transmission node is further configured to: switch off the transmit-end optical fiber amplifier of the first transmission node, in response to an interruption of the optical fiber between the first transmission node and the second transmission node and based on that the first transmission node does not receive, through the optical supervisory channel, the preset normal control signal sent by the second transmission node nor detect an optical data signal sent by the second transmission node.

16. The system according to claim 15, wherein the first transmission node is further configured to: send, through the optical supervisory channel, a third control signal comprising a preset error indicator to the second transmission node;

the second transmission node is further configured to: switch off the transmit-end optical fiber amplifier of the second transmission node according to the error indicator.

17. The system according to claim 14, wherein the first transmission node is further configured to: determine that the first control signal is the preset normal control signal based on that the first transmission node determines that the first control signal does not carry a preset error indicator.

18. The system according to claim 14, wherein the plurality of wavelength division multiplexing transmission systems are deployed in parallel between the first communication end and the second communication end.

19. The system according to claim 14, wherein the plurality of wavelength division multiplexing transmission systems share one optical cable.

* * * * *